United States Patent
Pettersson et al.

(10) Patent No.: US 9,699,394 B2
(45) Date of Patent: Jul. 4, 2017

(54) FILTER ARRANGEMENT FOR IMAGE SENSOR

(71) Applicant: Microsoft Technology Licensing, LLC, Redmond, WA (US)

(72) Inventors: Gustaf Pettersson, Lund (SE); Johan Windmark, Lund (SE); Jens Månsson, Malmö (SE); Radu Bilcu, Tampere (FI); Jörg Linke, Ylöjärvi (FI); Pasi Syvänen, Pirkkala (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/642,348

(22) Filed: Mar. 9, 2015

(65) Prior Publication Data
US 2016/0269654 A1 Sep. 15, 2016

(51) Int. Cl.
  H04N 5/33 (2006.01)
  H04N 5/235 (2006.01)
  G02B 5/20 (2006.01)
  H04N 5/238 (2006.01)
  H04N 5/353 (2011.01)
  H04N 9/04 (2006.01)

(52) U.S. Cl.
  CPC ............ *H04N 5/332* (2013.01); *G02B 5/208* (2013.01); *H04N 5/238* (2013.01); *H04N 5/2353* (2013.01); *H04N 5/33* (2013.01); *H04N 5/3537* (2013.01); *H04N 9/045* (2013.01)

(58) Field of Classification Search
  CPC ...... H04N 5/332; H04N 5/2353; H04N 5/238; G02B 5/208
  USPC .......................................................... 348/342
  See application file for complete search history.

(56) References Cited

U.S. PATENT DOCUMENTS

| | | | |
|---|---|---|---|
| 6,107,618 A * | 8/2000 | Fossum | H01L 25/167 250/208.1 |
| 7,460,160 B2 | 12/2008 | Hershey et al. | |
| 8,570,320 B2 | 10/2013 | Izadi et al. | |
| 8,599,291 B2 | 12/2013 | Min et al. | |
| 8,605,167 B2 | 12/2013 | Cote et al. | |
| 8,605,177 B2 | 12/2013 | Rossi et al. | |
| 8,624,341 B2 | 1/2014 | Holenarsipur et al. | |
| 8,760,499 B2 | 6/2014 | Russell | |
| 8,896,732 B2 | 11/2014 | Sa et al. | |

(Continued)

FOREIGN PATENT DOCUMENTS

| | | |
|---|---|---|
| EP | 2579573 A1 | 4/2013 |
| WO | 2012059656 A1 | 5/2012 |

(Continued)

OTHER PUBLICATIONS

McIlroy, et al., "Kinectrack: Agile 6-DoF Tracking Using a Projected Dot Pattern", In IEEE International Symposium on Mixed and Augmented Reality, Nov. 5, 2012, 7 pages.

(Continued)

*Primary Examiner* — Lin Ye
*Assistant Examiner* — Chan Nguyen (57) ABSTRACT

An apparatus for capturing two different types of light simultaneously is described. A filter array is used for filtering light arriving at an image sensor. The filter array comprises per pixel filters arranged in rows, so if a row comprises filters, they are all of the same type. Different exposure settings may be used for rows having different filter configurations.

20 Claims, 5 Drawing Sheets

(56) References Cited

U.S. PATENT DOCUMENTS

| | | | |
|---|---|---|---|
| 2007/0272836 A1* | 11/2007 | Higashitsutsumi | G01J 3/36 250/226 |
| 2008/0068475 A1* | 3/2008 | Choe | G06T 3/4015 348/273 |
| 2008/0191298 A1 | 8/2008 | Lin et al. | |
| 2009/0159799 A1* | 6/2009 | Copeland | G01J 3/36 250/338.1 |
| 2009/0268045 A1* | 10/2009 | Sur | G06K 9/00604 348/222.1 |
| 2009/0278048 A1* | 11/2009 | Choe | H01L 27/14652 250/339.05 |
| 2010/0295947 A1* | 11/2010 | Boulanger | H04N 9/045 348/164 |
| 2011/0249157 A1 | 10/2011 | Fredembach et al. | |
| 2012/0087645 A1* | 4/2012 | Wu | H04N 5/33 396/439 |
| 2012/0236190 A1 | 9/2012 | Ogasahara et al. | |
| 2013/0188057 A1* | 7/2013 | Lin | H04N 5/332 348/164 |
| 2013/0258112 A1 | 10/2013 | Baksht | |
| 2014/0160260 A1 | 6/2014 | Blanquart et al. | |
| 2014/0240492 A1 | 8/2014 | Lee | |
| 2014/0307055 A1 | 10/2014 | Kang et al. | |
| 2015/0109495 A1* | 4/2015 | Tanaka | H01L 27/14621 348/277 |

FOREIGN PATENT DOCUMENTS

| | | |
|---|---|---|
| WO | 2013027340 A1 | 2/2013 |
| WO | 2013064510 A1 | 5/2013 |
| WO | 2014106843 A2 | 7/2014 |

OTHER PUBLICATIONS

Geelen, et al., "A Compact Snapshot Multispectral Imager with a Monolithically Integrated per-Pixel Filter Mosaic", In Proceedigs of Advanced Fabrication Technologies for Micro/Nano Optics and Photonics VII, Mar. 7, 2014, 1 page.

Kalkofen, et al., "Comprehensible Visualization for Augmented Reality", In IEEE Transactions on Visualization and Computer Graphics, Mar. 2009, 13 pages.

"International Search Report and Written Opinion Issued in PCT Application No. PCT/US2016/018562", Mailed Date: May 10, 2016, 11 Pages.

"Second Written Opinion Issued in PCT Application No. PCT/US2016/018562", Mailed Date: Jan. 25, 2017, 7 Pages.

* cited by examiner

FILTER ARRANGEMENT FOR IMAGE SENSOR

BACKGROUND

Digital cameras are often used in mobile apparatuses, for example in mobile handsets. Recently, camera systems that provide both color and dense depth images have become available. Typically these camera systems comprise at least one infrared image sensor and at least one color image sensor. These camera systems may be used in a variety of new applications in the field of three-dimensional perception. Depth information is typically acquired by using structured infrared light, such as a laser, for projecting a pattern. The projected pattern is then captured by an infrared camera having an infrared sensor. Captured patterns are then used for determining the depth data. The depth data may then be correlated to an RGB camera.

Typically the pattern projected using infrared light is not clearly visible at longer distances. Conventionally this has been addressed by providing an infrared sensor with a band-pass filter passing the band near the used structured infrared light source. Thus, the infrared camera will have a high sensitivity peak around the wavelength of the structured light source. Thus, because of the band pass filter the pattern is visible in an image acquired with the camera. However, if the pattern is formed of a plurality of points, for example, between the points the acquired image consist very little image information.

As there is only very little information between the points the acquired image does not resemble the scene captured. Thus, edges of the objects in the image of the scene are very weak, if visible at all. In other words, the acquired image comprises almost only information that is visible in short distances. Furthermore, if a depth map computed from the pattern is very difficult to map to an image acquired by an RGB-camera when the camera calibration is not known or is inaccurate.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one example, apparatus comprises an image sensor and a filter arrangement for producing infrared light and visible light images simultaneously.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples may be described and illustrated herein as being implemented in a camera, this is only an example of an imaging apparatus and not a limitation. As those skilled in the art will appreciate, the present examples are suitable for application in a variety of different types of imaging and measurement devices.

In the following description, the term 'per pixel filter' is used to mean a filter that is configured to filter the light arriving at one pixel of an image sensor. Per pixel filters are typically manufactured together with the image sensor. The term 'global filter' is used to mean a filter that is configured to filter light arriving at an image sensor. Typically per pixel filters are attached to an image sensor when the image sensor is manufactured so that can be aligned accurately. In the following description, the term 'global filter' is used to mean a filter that covers the whole image sensor and filters the light arriving at every pixel of the image sensor.

Figure 1A:
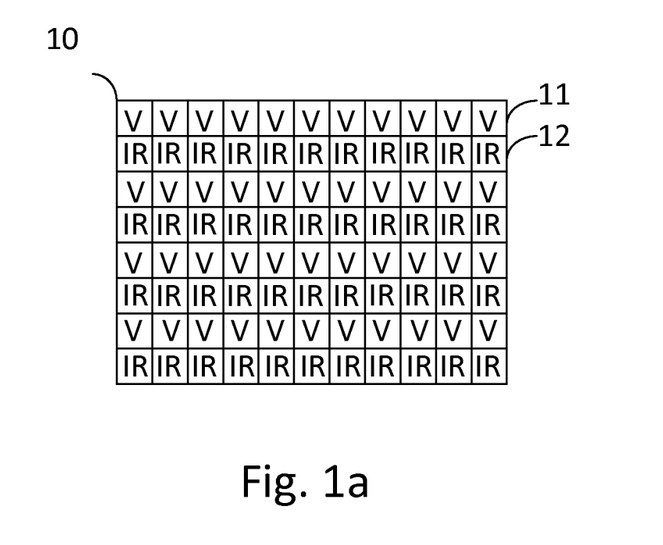
FIG. 1a is a view of a filter array for an image sensor.
Figure 1B:
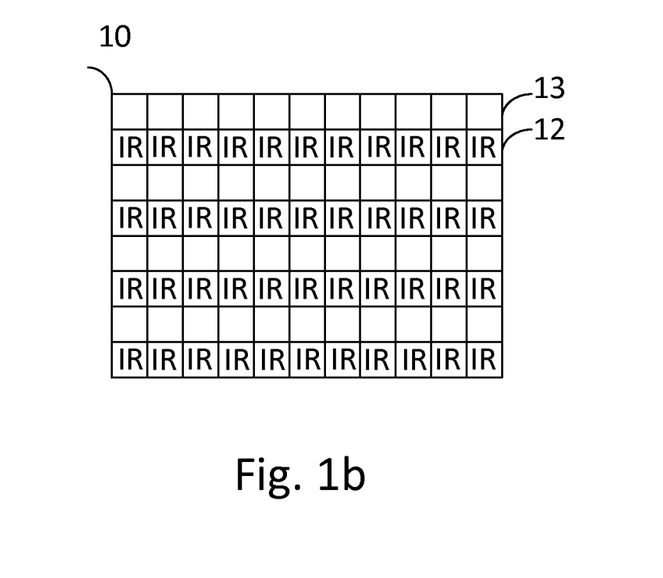
FIG. 1b is a view of a filter array for an image sensor.
Figure 1C:
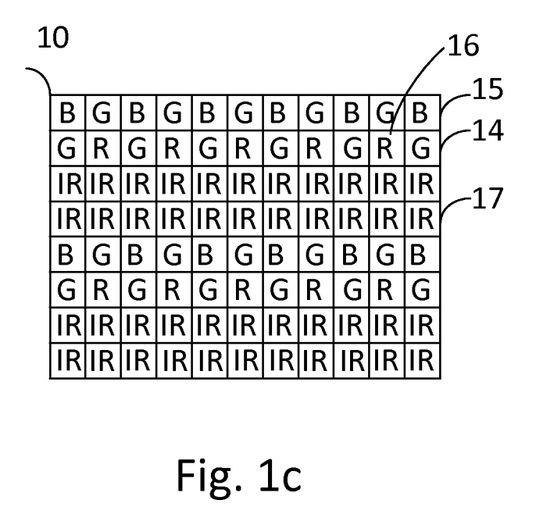
FIG. 1c is a view of a filter array for an image sensor.

FIGS. 1a, 1b and 1c show a filter array 10 for an image sensor according to an embodiment. The filter array of FIG. 1a comprises 11*8 filters configured to filter a corresponding image sensor, the image sensor thus having 11*8 pixel sensors, herein also referred to as pixels, where each pixel often contains a photodetector and an active amplifier. Thus, the filter array comprises eight rows and each row comprises eleven filters. The resolution of the image sensor is chosen for clarity reasons. A typical image sensor and respective filter comprises thousands of rows and thousands of pixels per row. Thus, when using a filter array 10 together with an image sensor of 11*8 pixels, every pixel on the image sensor will be exposed through a filter. The purpose of filtering is to let only desired wavelengths of the light expose the image sensor.

The filter array 10 in FIG. 1a and FIG. 1b is configured such that each row consists of filters of only one type. The first row 11 as well as all odd rows comprise visible light filters. The term 'visible light filter' is used herein to mean a filter that is configured to let wavelength that can be detected by human eye pass through the filter. The visible light filter may let the whole visible light spectrum pass or it may let a portion of the spectrum pass, such as a specific color for color coding. Undesired wavelengths, such as infrared, may be filtered away. In FIG. 1a these filters are configured such that they let the whole visible light spectrum pass through for exposing the respective pixel row on the image sensor. This corresponds with the conventional photography where the purpose is to produce an image of an object as a human eye sees it. Even if visible light filters are illustrated in FIG. 1a, they are optional as described later in more detail.

The filter array 10 is further configured such that the second row 12 and all even rows comprise infrared light filters. In the filter array 10, infrared filters are, for example, long pass filters. The cut-on wavelength depends on the desired wave length. For example, if infrared light is produced by an infrared laser of 830 nm, as in the following example, a cut-on wavelength of 810 nm could be applied. Even if infrared light is discussed herein, it is optional. For example, in other imaging applications ultraviolet light might be used instead.

In the filter array 10, visible light filters and infrared light filters are evenly distributed. Odd rows consist of visible light filters 11 and even rows consist of infrared light filters. By arranging the filters in the array so that each row consists of filters of only one type, it is possible to apply exposure on a row basis. Thus, visible light rows and infrared light rows may have different exposure settings to emphasize odd or even rows.

In FIG. 1a, each row comprises filters, although this is not necessary. For example, in a further embodiment the arrangement of FIG. 1a could be modified so that odd rows do not have filters and even rows have infrared or ultraviolet filters as discussed above. An example of this is shown in FIG. 1b, where rows 13 do not comprise filters. Rows 12 comprise filters as explained above. The above discussed patterns may also be used in an embodiment where only a number of rows have filters, for example infrared or ultraviolet filters, and another number of rows do not have filters.

The filter array 10 may also be arranged differently than shown in FIG. 1a. For example, a designer may design a pattern of how the rows are arranged. For example, as shown in FIG. 1c instead of alternating the rows of visible light filters and the rows of infrared light filters between odd and even rows, a 2+2 arrangement could be used, wherein two infrared filter rows will follow two visible light filter rows. Or alternatively, two infrared filter rows will follow one visible light filter row, or one infrared filter row will follow two visible light rows. Furthermore, if a color filter, such as a Bayer filter is used as a visible light filter, the filter might require two consecutive rows for achieving the desired filtering result. In FIG. 1c a Bayer filter is shown, wherein green 14, blue 15 and red 16 filters are used as visible light filters. In the figure first and second row consist visible light filters that are filtering green, red and blue such that a color image can be constructed. The arrangement of FIG. 1c is only an example and also other color filter arrangements are available. After two visible light rows two rows with infrared filters 17 are provided.

A benefit of arrangements mentioned above is that infrared light and visible light are captured simultaneously and there is no time difference in the capturing time. Furthermore, as the visible light is captured simultaneously there is image data between the infrared information, such as a pattern of infrared dots. Furthermore, if the scene involves longer distances where the infrared pattern is not visible the edges of the objects may still be detected. Even if the patterns discussed above include only two different filter types, it is possible to have any number of filter types arranged in a pattern.

In FIGS. 1a, 1b and 1c rows and columns are straight. The arrangements described above may be used also in different patterns when the principles described above with regard to filter arrangements and exposure can be met. For example, an image sensor with honeycomb like arrangement may be used. In such, or even more complicated, arrangement filters must be placed according to the path of exposure.

Figure 2:
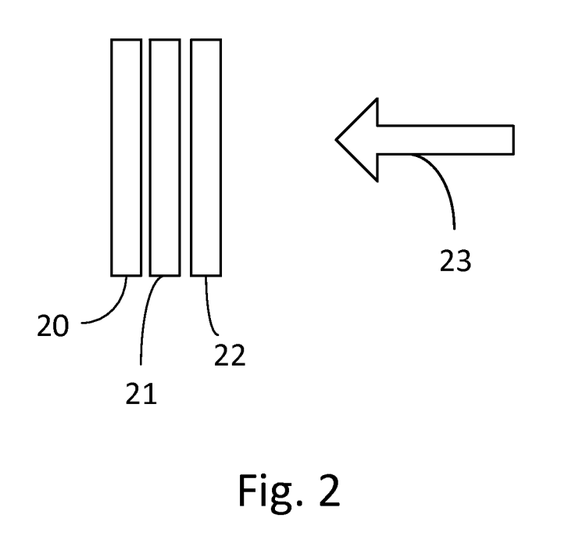
FIG. 2 shows a simplified structure of an apparatus.

FIG. 2 shows a simplified structure of an apparatus using a filter array similar to the filter array of FIG. 1a or 1b. The apparatus comprises an image sensor 20, a filter array 21 and a global filter 22. An arrow 23 is used to illustrate the direction of incoming light. Thus, the light first arrives at the global filter 22, then at the filter array 21 and then at the image sensor 20.

In an embodiment it is assumed that the filter array 21 is similar to that discussed above. Thus, the infrared light filters can be long pass filters having a cut-on wavelength of 810 nm when the desired wavelength of infrared to be captured is 830 nm. A global filter 22 may then be used for improving the infrared light capture. The global filter may be, for example, a short pass filter with a cut-off wavelength of 850 nm.

Together with the global filter 22, each filter in filter array 21 rows consisting of infrared filters as described above form a band pass filter so that the infrared filtered rows of the image sensor are exposed by a desired wavelength of infrared light. Furthermore, by using this arrangement, the exposing of the visible light rows is not disturbed by the band pass filter formed by the infrared filter rows. This will make the infrared light visible at longer ranges and in high ambient light while maintaining the possibility to produce a visible light image by using visible light filtered rows.

In a further embodiment, rows are exposed according to the filtering. The visible light filtered rows are typically exposed so that as much information as possible is acquired by the sensor pixels. This corresponds to the conventional photography where an appropriate exposure is required.

As explained above, an infrared light source, such as a laser device, is typically used together with the apparatus described above. The infrared laser is typically used for projecting a pattern, for example a plurality of dots, on the imaged object. These infrared dots are not visible to the human eye or, for example, to an RGB-camera and are measured by using an infrared camera. In order to improve the visibility of these dots, the infrared filtered rows may be exposed more than the visible light filtered rows. When a laser device is used for producing the pattern, a narrow band pass filter may be used for filtering infrared light. Using a band pass filter reduces noise from the captured images as most of the light of undesired wavelengths is filtered out and does not over expose the captured image.

By using an arrangement discussed above, it is possible to produce depth images comprising infrared pixels and visible light pixels that can be used as such or be accurately mapped to an RGB image captured by an additional RGB-camera. Furthermore, the edge quality in depth images is improved compared to solutions using a global band pass filter, and depth information at a long range can be computed if the scene contains a visible texture. Furthermore, the arrangement discussed above allows the designer to choose the number of infrared pixels used, typically allowing the use of more pixels.

Figure 3A:
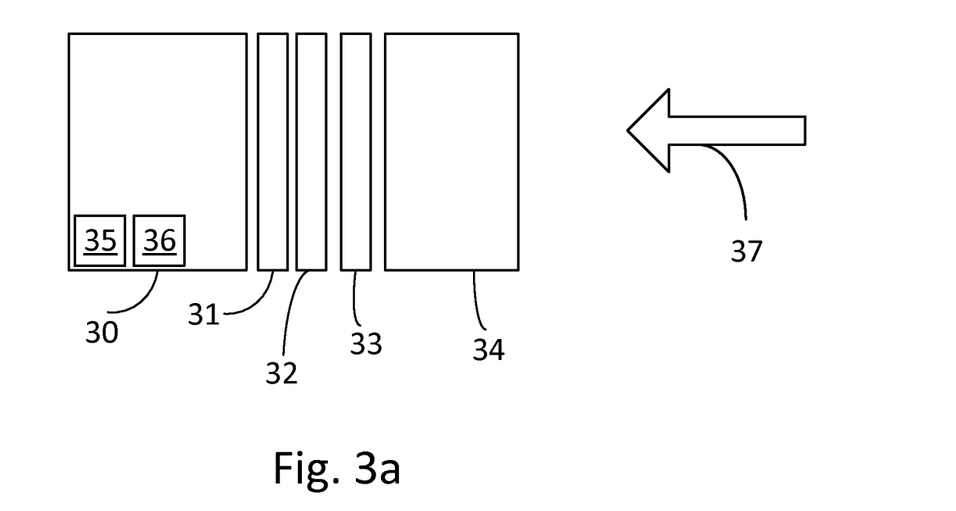
FIG. 3a shows simplified structures of a camera.
Figure 3B:
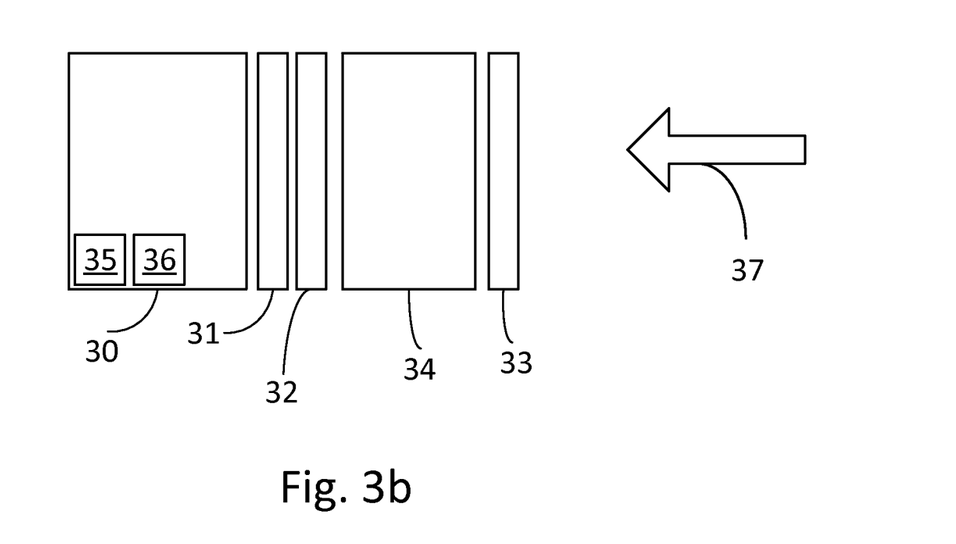
FIG. 3b shows simplified structures of a camera.

FIGS. 3a and 3b show a simplified structure of a camera. The camera comprises a body 30. The body further comprises at least one processor for executing computer programs and processing acquired images 35 and at least one memory 36 storing program instructions and acquired images. The camera comprises an image sensor 31, for example a CMOS-sensor. The camera further comprises a filter array 32. The filter array is similar to the above described filter arrays. The camera further comprises a global filter 33, which may be any conventional global filter but preferably follows the principles explained above. The camera further comprises at least one lens 34 through which the arriving light 37 passes. The camera may comprise a computer program or other instructions in the memory 36 that is executed by the processor for exposing the image sensor according to a predetermined pattern so that a number of rows have a different exposure setting. For example, if odd rows of the filter array have visible light per pixel filters and even rows of the filter array have infrared filters, the processor 35 may instruct a different exposure setting to be used for odd and even rows so that as much information as possible can be acquired. This will particularly enable better visibility of infrared light in high ambient light or for longer distances.

The exposure setting may be selected manually or automatically. When automatic exposure setting is used visible light rows and infrared light rows may be treated as two different frames and the automatic exposure setting may be calculated independently for both types of light. In case of two different frames these two frames may be received directly from the image sensor. If the image sensor is not capable of producing two different frames the frame received from the image sensor may be split into two frames in accordance with the filter pattern.

FIG. 3a shows an embodiment of a camera. In the embodiment, the global filter 33 has been arranged between the lens 34 and the filter array 32. FIG. 3b shows a further embodiment of a camera. In the embodiment, the global filter 33 is arranged in front of the lens 34. In other words, the lens 34 is arranged between the filter array 32 and the global filter 33. Both embodiments may be used for the same purposes and produce the same effect. Furthermore, even if not shown in the figures, the present embodiments allow the use of further filters or other optical components together with the presented embodiments.

In a further embodiment, the camera discussed above comprises an infrared light source attached to the camera, although this is not necessary, and an additional external infrared light source may be used as explained in the following example.

The above described camera may be used in a plurality of applications. For example, the infrared light capture discussed above may be used in any application involving depth information computation. The applications may involve the use of one or more imaging devices as discussed above.

Figure 4:
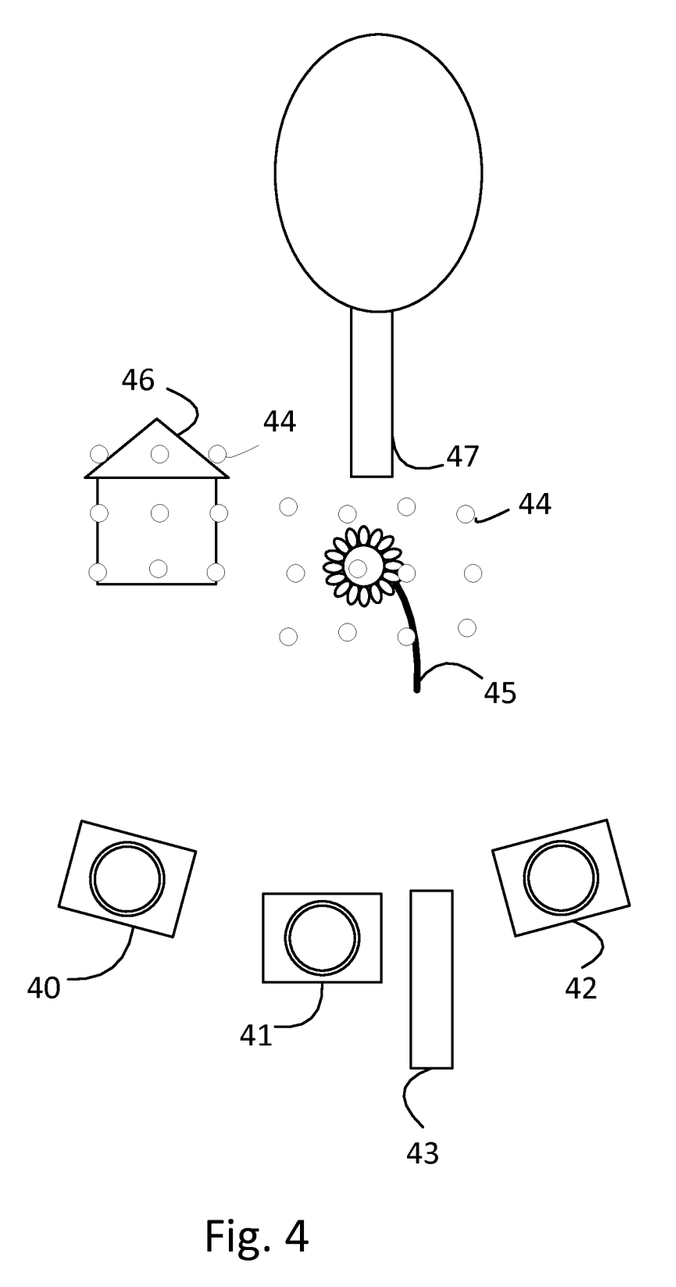
FIG. 4 illustrates an example of taking a picture using a camera system.

In FIG. 4, a partial illustration of an embodiment of an application in which the above described apparatus may be used is shown. The apparatus and the principles explained above may be used also in various other embodiments that may involve a plurality of independent apparatuses described above. In some embodiments, the above described apparatuses are included in one casing so that a plurality of image sensors and filter arrays are used in a single imaging device. Furthermore, the single imaging device may include other components and further imaging apparatuses that are of a different type. Furthermore, even if in the following example two apparatuses according to the description above are used, it is not necessary to use two or more apparatuses in all applications, but also applications with only one apparatus may be implemented.

FIG. 4 shows an embodiment comprising two cameras 40 and 42 comprising an image sensor described above, an infrared light source 43 and an RGB camera 41 are used in an outdoor environment. In the embodiment as the two cameras 40, 42, a camera according to FIG. 3a or 3b can be used. These cameras 40, 42 are configured to produce depth images including depth information that is derived by computing from an infrared light pattern on an object projected by an infrared light source 43. The infrared light source 43 does not need to be calibrated with cameras 40 and 42. In FIG. 4, the pattern 44 comprises dots that are projected towards a flower 45, a doghouse 46 or a tree 47. The tree is located far in the background and the dots 44 are not visible on the tree. The pattern 44 in FIG. 4 is a grid of dots. The needs not to be a perfect grid but pattern may be organized so that different portions of the grid can be detected by analyzing. Furthermore, a camera sees a reflected grid that typically deviates from the projected grid because the reflection points may at different distances. The dots 44 on the flower 45 and the doghouse 46 may be captured by infrared filtered rows of a depth image. It is possible that some of the dots 44 are shown, for example on the grass around the flower 45. The edges of the flower 45, the doghouse 46 and the tree 47 may be captured by visible light rows of the depth image. Thus, the edges of the tree may be used as additional information even if the infrared information cannot be captured.

In the embodiment of FIG. 4, the infrared light source 43 is a light source comprising an infrared laser with a diffractive optical element. The infrared light source is configured to produce a dot-pattern 44. The wavelength of the infrared laser is typically chosen slightly outside of the visible spectrum, such as 830 nm. In the embodiment, the infrared light source 43 is an external device; particularly for one camera applications, the infrared light source 43 may be arranged together with the camera device.

In the embodiment of FIG. 4, an RGB camera 41 is used. The RGB camera is used to capture the image as a human eye sees it. The information acquired by cameras 40, 42 may be then mapped to the RGB image. Typically all cameras and the light source are connected to a computing device which will make the required computations and use the information achieved as a result of the computation. The positions and orientations of cameras 40-42 and light source 43 are only examples and they can be placed in different ways.

In an embodiment, the above disclosed principles are applied to a conventional digital camera or a device comprising a conventional digital camera, such as a mobile phone, computer, tablet computer or similar device.

Figure 5:
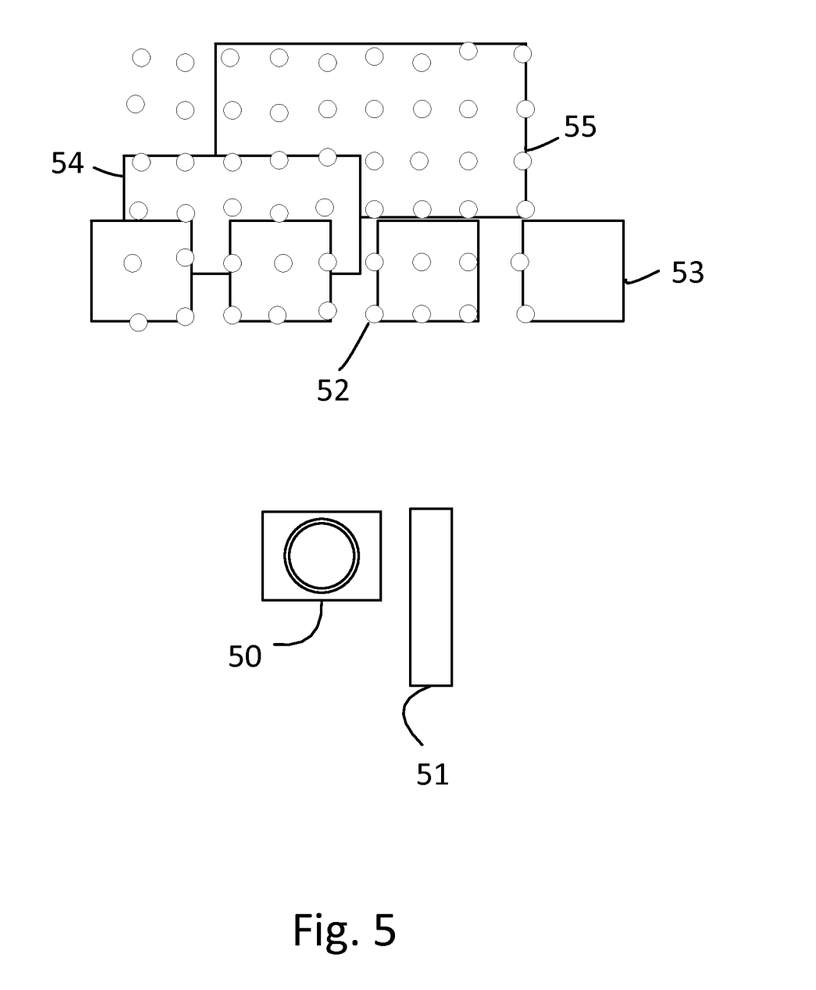
FIG. 5 illustrates an example of taking a picture using a camera system.

FIG. 5 shows an embodiment having a camera system comprising one camera 50 comprising an image sensor described above and an infrared light source 51. The camera may have, for example, an image sensor as shown in any of FIG. 1c so that it is capable of producing a color image with infrared information. The infrared light source is calibrated with the camera 50. The camera system is used in an empty classroom comprising pupils desks 53, teachers desk 54 behind the pupils desks 53 and a black board 55 behind the teachers desk 54. The pattern of infrared dots 52 produced with the infrared light source 51 can be seen on the objects. When one camera is used the changes in depth information are determined based on the changes detected in the pattern. For example, if a teacher sits behind the table the pattern deviates from the empty class room pattern.

Even if FIG. 4 shows three cameras and FIG. 5 only one camera other camera combinations are possible. It is possible to use one, two or even more cameras and an optional RGB camera may be provided. For example, the embodiment of FIG. 5 may be complemented with an RGB-camera and in FIG. 4 the RGB-camera 41 may be omitted. The number of cameras is determined on an application basis.

An example of an apparatus comprises an image sensor comprising an array of pixels, wherein said array comprises rows of pixels, a filter array corresponding to said array of pixels, the filter array comprising per pixel filters configured to filter light arriving at said array of pixels, wherein said filter array comprises first filter rows consisting of filters of a first type arranged at a first number of said rows of pixels and a global filter configured to filter light arriving at said filter array.

Another example of an apparatus comprises an image sensor comprising an array of pixels, wherein said array comprises rows of pixels and a filter array corresponding to said array of pixels, the filter array comprising per pixel filters configured to filter light arriving at said array of pixels, wherein said filter array comprises first filter rows consisting of filters of a first type arranged at a first number of said rows of pixels and second filter rows consisting of filters of a second type arranged at a second number of said rows of pixels. Additionally the apparatus comprises a global filter configured to filter light arriving at said filter array.

In one example each filter of a first type in said filter array and said global filter form a band pass filter. In one example said filters of a first type comprise one of infrared filters and ultraviolet filters. In one example said first filter rows and said second filter rows are arranged according to a predetermined pattern. In one example said apparatus further comprises a lens configured to distribute received light to said image sensor. In one example said filter array is located on said image sensor and said global filter on said filter array. In an alternative example said filter array is located on said image sensor, said lens on said filter array and said global filter on said lens. In an example a first exposure setting is used for exposing pixels on first filter rows and a second exposure setting is used for exposing pixels on second filter rows.

In one example a camera comprises an image sensor comprising an array of pixels, wherein said array comprises rows of pixels, a filter array corresponding to said array of pixels, the filter array comprising per pixel filters configured to filter light arriving at said array of pixels, wherein said filter array comprises first filter rows consisting of filters of a first type arranged at a first number of said rows of pixels and second filter rows consisting of filters of a second type arranged at a second number of said rows of pixels, and a lens through which light arrives at said filter array. In one example a camera further comprises a global filter configured to filter light arriving at said filter array.

Any range or device value given in the description may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the elements identified, but so that such elements do not comprise an exclusive list and an antenna or apparatus may contain additional elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus comprising:
   an image sensor comprising an array of pixels, wherein said array comprises a plurality of rows of pixels, the plurality of rows of pixels comprising a first odd row of pixels, a first even row of pixels, a second odd row of pixels, and a second even row of pixels;
   a filter array comprising per pixel filters configured to filter light arriving at said array of pixels, wherein said filter array comprises a first set of visible green light per pixel filters, a second set of visible green light per pixel filters, a set of visible blue light per pixel filters, a set of visible red light per pixel filters, a first set of infrared light per pixel filters, and a second set of infrared light per pixel filters, the first set of visible green light per pixel filters and the set of visible blue light per pixel filters being the only per pixel filters arranged at the first odd row of pixels, the second set of visible green light per pixel filters and the set of visible red light per pixel filters being the only per pixel filters arranged at the first even row of pixels, the infrared light per pixel filters being the only per pixel filters arranged at the second odd row of pixels, the second set of infrared light per pixel filters being the only per pixel filters arranged at the second even row of pixels; and
   a global filter configured to filter light arriving at said filter array.

2. An apparatus according to claim 1, said filter array and said global filter form a band pass filter.

3. An apparatus according to claim 1, wherein the first set of visible green light per pixel filters are placed at every even numbered pixel in the first odd row of pixels.

4. An apparatus according to claim 3, wherein the set of visible blue light per pixel filters are placed at every odd numbered pixel in the first odd row of pixels.

5. An apparatus according to claim 1, wherein said apparatus further comprises a lens configured to distribute received light to said image sensor.

6. An apparatus according to claim 1, wherein the set of visible red light per pixel filters are placed at every even numbered pixel in the first even row of pixels.

7. An apparatus according to claim 6, wherein the second set of visible green light per pixel filters are placed at every odd numbered pixel in the first even row of pixels.

8. An apparatus according to claim 7, wherein said array comprises a third odd row of pixels, a third set of visible green light per pixel filters and a second set of visible blue light per pixel filters being the only per pixel filters arranged at the third odd row of pixels.

9. An apparatus comprising:
   an image sensor comprising an array of pixels, wherein said array comprises a plurality of rows of pixels, the plurality of rows of pixels comprising a first odd row of pixels, a first even row of pixels, a second odd row of pixels, and a second even row of pixels; and a filter array corresponding to said array of pixels, the filter array comprising per pixel filters configured to filter light arriving at said array of pixels, wherein said filter array comprises:

a first set of visible green light per pixel filters and a set of visible blue light per pixel filters being the only per pixel filters arranged at the first odd row of pixels;

a second set of visible green light per pixel filters and a set of visible red light per pixel filters being the only per pixel filters arranged at the first even row of pixels;

a first set of infrared light per pixel filters being the only per pixel filters arranged at the second odd row of pixels; and a second set of infrared light per pixel filters being the only per pixel filters arranged at the second even row of pixels.

10. An apparatus according to claim 9, wherein the apparatus further comprises a global filter configured to filter light arriving at said filter array.

11. An apparatus according to claim 10, wherein said filter array and said global filter form a band pass filter.

12. An apparatus according to claim 9, wherein the first set of visible green light per pixel filters are placed at every even numbered pixel in the first odd row of pixels.

13. An apparatus according to claim 12, wherein the set of visible blue light per pixel filters are placed at every odd numbered pixel in the first odd row of pixels.

14. An apparatus according to claim 13, wherein the set of visible red light per pixel filters are placed at every even numbered pixel in the first even row of pixels.

15. An apparatus according to claim 14, wherein the second set of visible green light per pixel filters are placed at every odd numbered pixel in the first even row of pixels.

16. An apparatus according to claim 15, wherein said array comprises a third odd row of pixels, a third set of visible green light per pixel filters and a second set of visible blue light per pixel filters being the only per pixel filters arranged at the third odd row of pixels.

17. A camera comprising:

an image sensor comprising an array of pixels, wherein said array comprises a first odd row of pixels, a first even row of pixels, a second odd row of pixels, and a second even row of pixels;

a filter array corresponding to said array of pixels, the filter array comprising per pixel filters configured to filter light arriving at said array of pixels, wherein said filter array comprises;

a first set of visible green light per pixel filters and a set of visible blue light per pixel filters being the only per pixel filters arranged at the first odd row of pixels;

a second set of visible green light per pixel filters and a set of visible red light per pixel filters being the only per pixel filters arranged at the first even row of pixels;

a first set of infrared light per pixel filters being the only per pixel filters arranged at the second odd row of pixels; and a second set of infrared light per pixel filters being the only per pixel filters arranged at the second even row of pixels; and a lens for receiving light arriving at said filter array.

18. A camera according to claim 17, wherein the camera further comprises a global filter configured to filter light arriving at said filter array.

19. A camera according to claim 18, wherein said filter array and said global filter form a band pass filter.

20. A camera according to claim 17, wherein the first set of visible green light per pixel filters are placed at every even numbered pixel in the first odd row of pixels.

* * * * *